(12) United States Patent
Turner (10) Patent No.: US 7,161,481 B2
(45) Date of Patent: Jan. 9, 2007

(54) INTELLIGENT COMPONENT MANAGEMENT FOR FIRE AND OTHER LIFE SAFETY SYSTEMS

(75) Inventor: Gregory N. Turner, Cary, NC (US)

(73) Assignee: Honeywell International Inc., Morristown, NJ (US)

( * ) Notice: Subject to any disclaimer, the term of this patent is extended or adjusted under 35 U.S.C. 154(b) by 61 days.

(21) Appl. No.: 10/878,475

(22) Filed: Jun. 28, 2004

(65) Prior Publication Data

US 2005/0285730 A1 Dec. 29, 2005

(51) Int. Cl.
*G08B 29/00* (2006.01)

(52) U.S. Cl. ............. 340/516; 340/506; 340/514

(58) Field of Classification Search ........... 340/539.11, 340/539.14, 539.22, 539.26, 540, 541, 500, 340/501, 506, 514, 517, 526; 702/183, 184; 705/7, 8, 50; 707/2, 10, 101; 345/327
See application file for complete search history.

(56) References Cited

U.S. PATENT DOCUMENTS

| | | | | |
|---|---|---|---|---|
| 5,155,469 A | | 10/1992 | Hartmann et al. ..... 340/539.17 |
| 5,724,261 A | * | 3/1998 | Denny et al. ............... 702/184 |
| 5,950,150 A | * | 9/1999 | Lloyd et al. ................ 702/183 |
| 6,222,530 B1 | * | 4/2001 | Sequeira ................... 715/500.1 |
| 6,366,919 B1 | * | 4/2002 | O'Kane et al. ............. 707/101 |
| 6,370,454 B1 | | 4/2002 | Moore ........................ 340/438 |
| 6,553,336 B1 | | 4/2003 | Johnson et al. ............. 702/188 |
| 6,622,115 B1 | | 9/2003 | Brown et al. ................ 702/183 |
| 6,624,750 B1 | * | 9/2003 | Marman et al. ............ 340/506 |
| 6,661,340 B1 | * | 12/2003 | Saylor et al. ............... 340/517 |
| 6,691,172 B1 | | 2/2004 | Clow et al. ................. 709/246 |
| 6,838,988 B1 | * | 1/2005 | Lennartz et al. ....... 340/539.26 |
| 6,954,737 B1 | * | 10/2005 | Kalantar et al. ............. 705/50 |
| 2003/0036939 A1 | | 2/2003 | Flores et al. |
| 2004/0019511 A1 | | 1/2004 | McKinney |

OTHER PUBLICATIONS

2004 System Sensor, Product overview.

* cited by examiner

*Primary Examiner*—Van T. Trieu (57) ABSTRACT

Automated systems and methods provide for enhanced management of components of fire safety systems. Components are identified which require action to ensure compliance with a schedule associated with the components. User and/or electronic output is generated that identifies components and required actions, such actions including inspections, functional testing, maintenance and calibration activities. A record of the identified components may be stored in a system log along with maintenance information. The system log may be reviewed against the schedule based on conformance to ordinances or maintenance requirements. Required actions may be annunciated for the identified components, and the system log may be updated to indicate actions performed on system components. Components may be identified that will require action within a predetermined timeframe and an alert or report may be generated for components that are not in compliance with their associated schedule.

41 Claims, 6 Drawing Sheets

INTELLIGENT COMPONENT MANAGEMENT FOR FIRE AND OTHER LIFE SAFETY SYSTEMS

FIELD OF THE INVENTION

This invention relates in general to fire and other life safety systems, and more particularly to safety systems that incorporate intelligent component management.

BACKGROUND OF THE INVENTION

Due to great loss of life historically, fire alarm and life safety related systems are now required in public buildings and large housing complexes, as well as in business structures. Fire marshals are usually tasked with the job of ensuring that public and commercial buildings have the proper protection in the event of a fire. However, many established structures, such as high-rise buildings built in the 1970s and 1980s, are not in compliance with current fire codes. Moreover, fire codes have generally changed significantly within the past two decades, and many legacy fire/safety systems require updating. It is also expected that the fire codes will continue to change as technology is developed and experience is gained. Modern systems, particularly large-scale systems needed for high-rises and large building complexes, often include security and intrusion alarm functions, in addition to fire alarm and suppression systems. Maintaining these systems in compliance with changing federal, state, and local ordinances and building codes creates a challenge for both fire marshals as well as building owners/managers.

Often, fire alarm/security systems are upgraded during the life of a given building, resulting in an assortment of sensors, components, and devices of varying technologies and capabilities. In some cases, such a sensor assortment may include sensors of the same type, but of different generations of manufacture. The owner/operator of these systems may sometimes not fully understand the compliance requirements of their own systems relative to ordinances and best-practices, much less expect a fire marshal with limited time for system evaluation to be able to identify and determine system compliance and safety issues.

The scope of issues and problems associated with many of such systems extends beyond false alarms and includes other challenges linked to outdated and non-compliant alarm systems with sensors that may or may not be operating properly. Accordingly, the above-discussed issues have been difficult to fully address when attempting to implement a variety of components and systems involving fire and security systems, such as fire/security alarm systems incorporating multiple nodes having a large number of components.

SUMMARY OF THE INVENTION

To overcome limitations and issues described above, and to overcome other limitations that will become apparent upon reading and understanding the present specification, the present invention discloses a system, apparatus and method for addressing challenges related to fire and security systems.

In one illustrative embodiment of the present invention, an automated method for managing a fire/security and other life safety systems involves providing a system log including data associated with two or more of the components of the safety system, the log including a schedule associated with the two or more components. Components are identified which require action needed to be in compliance with the associated schedule. User perceivable output is generated for the identified components. Alternatively, or in addition, an information bearing signal containing information regarding the system log and/or the identified components may be generated. The system output information and/or signal information may be transmitted to a remote location, such as via a network link.

The required actions may be, for example, functional testing of the identified components, inspection, maintenance and/or calibration actions. The method may further involve storing a record of the identified components in the system log. The record may include a maintenance report. The system log may be reviewed against the schedule based on conformance to an ordinance, code, and/or specification or requirement. The actions may be annunciated for the identified components using, for example, lights, graphic displays, printed reports, aural or audio messages, or other annunciation mechanisms.

The system log may be updated to indicate actions performed on system components. Components may be identified that will require action within a predetermined timeframe. After updating the system log to indicate actions performed, an alert may be annunciated for each component of the fire/security or other life safety system that has an outstanding action identified. The alert may be annunciated for the components associated with the fire/security or other life safety system that are not in compliance with their associated schedule.

The fire/security/life safety system may include multiple nodes, such that reviewing the system log may involve the system primary node querying other nodes in the system for a system log update. The other nodes may respond to the system primary node query by transmitting performed actions for any components controlled by the other nodes. The primary node may update the system log with each node's performed actions before identifying which of the components requires action in compliance with the associated schedule. The method may further involve querying the fire/security or other life safety system (locally or remotely) for a component log report and providing a report of the log of all actions performed on the component. The method may note a need for testing or calibration when a new component is attached to the fire/security/life safety system.

Another embodiment of the present invention is directed to a fire safety system having a system controller, two or more components, including sensors, and a memory coupled to the system controller. The memory is configured to maintain a system log comprising a record of each of the system components. The records preferably include information concerning one or more of inspecting, testing, maintenance, and calibration of the system components. The memory is further configured to support a schedule of actions associated with the system components. The first safety system further includes a communications system configured to provide communications between the system controller and the system components. A notification system is configured to produce an output concerning the schedule of actions associated with the system components. The controller is preferably configured to determine, using the system log and schedule of actions, which of the system components requires one or more of inspecting, testing, maintenance, calibration or other action.

The fire safety system may include more than one node communicatively coupled to the system controller, wherein each node includes a node controller with componentry associated with the node. Each node may be configured to maintain a node log, the node log including a list of components and a record of one or more of inspecting, testing, maintenance, calibration or other action performed on the components. For example, the communications system may be configured to effect communications between the fire safety system and a network. The communications system may, for example, be used to effect remote operational control of the fire safety system via the network.

The notification system may be configured to generate a report indicating the system components that require one or more of inspecting, testing, maintenance, and calibration. For example, the notification system may be configured to generate a list indicating the system components that are due for one or more of inspecting, testing, maintenance, and calibration within a pre-defined time frame.

The notification system is configured to generate a report indicating the system components that have been subject to one or more of inspecting, testing, maintenance, and calibration. For example, the notification system may by configured to generate a report concerning actions performed or yet to be performed on the system components, or a report of the system log. The notification system may also be configured to generate an information bearing signal indicative of system and component information for transmission over a network or other communication link. The notification system may also include one or both of a display and a visual annunciator arrangement.

The system components may include one or more of a fire alarm pull stations and an intrusion switch, for example. The system components may also include various sensors, including a water flow sensor, toxic gas detection, power failure/quality sensor, critical process monitoring sensors, glass break sensor, a motion detector, and/or a smoke detector, for example.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

Various example embodiments of the invention are described in connection with the embodiments illustrated in the following diagrams.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE INVENTION

In the following description, reference is made to the accompanying drawings that form a part hereof, and in which is shown by way of illustration particular embodiments in which the invention may be practiced. It is to be understood that other embodiments may be utilized, as structural and operational changes may be made without departing from the scope of the present invention.

According to an illustrative embodiment of the present invention, a fire safety system that incorporates intelligent component management is described with reference to various sensors, components, and associated systems. In the various illustrative embodiments and implementations thereof discussed in connection with the figures and otherwise as follows, certain terms and reference numbers may optionally be implemented in a manner not inconsistent with other approaches discussed herein and involving similar terms and reference numbers.

One way to mitigate the maintenance and regulatory issues related to fire/security and other life safety systems is to track and enforce the component validation at commissioning, and recurring testing of these devices at the various intervals required based on changing regulatory and manufacturer requirements. This minimizes costs from using the lowest common denominator approach for determining complete system testing, while ensuring that each device is validated and serviced at required intervals.

The present invention provides for integration of data automatically stored within intelligent field components, as well as data stored within the system controller for any field components, when they are tested, inspected, calibrated, maintained, installed or subject to other action of interest. A fire safety system of the present invention manages system components using data acquired by each component and a system log that includes a schedule associated with each of the system components. The system log and schedule ensures that necessary actions for the components are taken, and within a time frame established for certain components. Such actions include, but are not limited to, inspection, installation, testing, calibration, and maintenance actions.

For example, a fire safety system of the present invention includes a system controller that, for each or selected system components, electronically reads and checks the date and time elapsed for a given action against a database of required maintenance intervals defined for the particular component and action. In this manner, the system controller can determine when a given component requires inspection, testing, calibration, or other maintenance task, and identify those components that have a scheduled but incomplete action. Using this approach, for example, a component that is newly installed and tested will automatically have a maintenance interval established that is specific to the component type.

A variety of reports and electronic information may be generated. For example, reports may be provided at the system level for components requiring service within a pre-determined time period, components that are overdue for service, a last service date for all components, or other reports of interest. Reports may be remotely requested via, for example, TCP-IP Internet protocols or other communications techniques. Components may be able to store multiple dates for different service tasks that have different time intervals. Systems may generate fault messages and be able to transmit requests for service when a component becomes overdue or scheduled for service.

Figure 1:
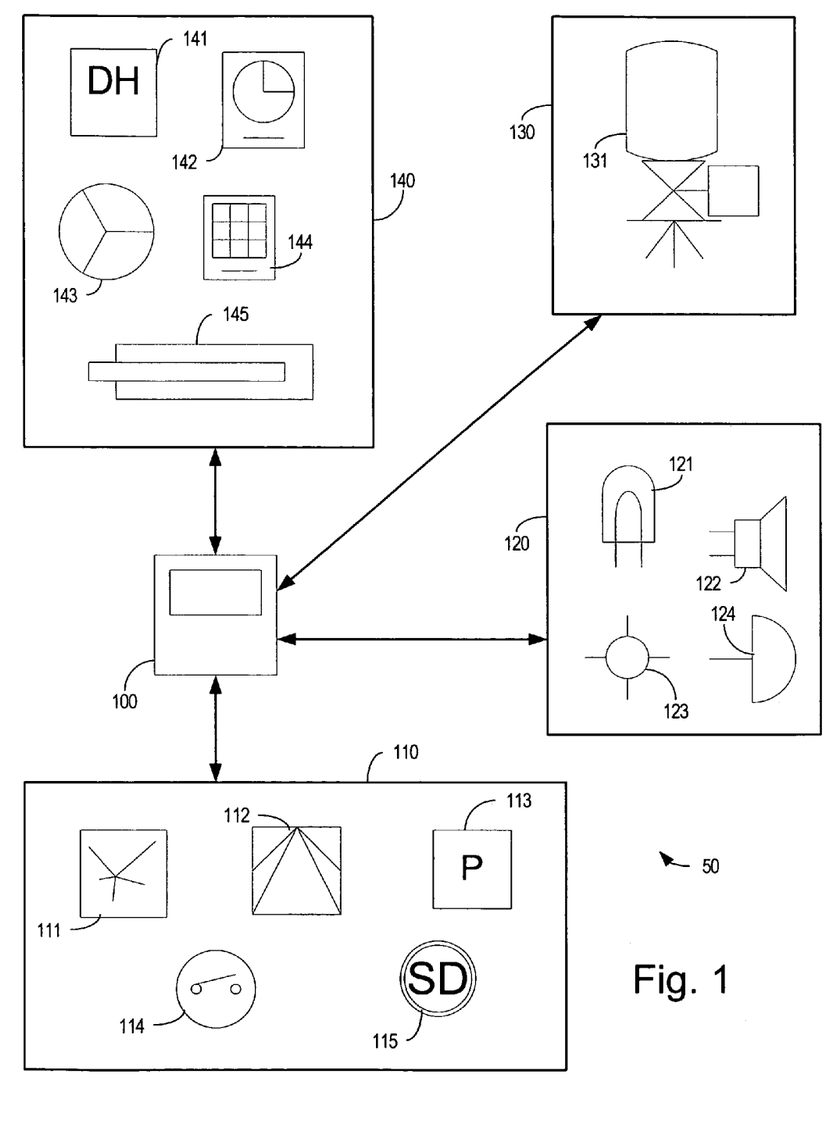
FIG. 1 is a block diagram of fire safety system componentry in accordance with embodiments of the present invention.

FIG. 1 is a block diagram of a fire safety system 50 in accordance with embodiments of the present invention. The fire safety system 50 includes a system controller 100 communicatively coupled to optional system componentry such as sensors 110, annunciators 120, suppression systems 130, and access control devices 140. Communications between the system controller 100 and the componentry may utilize direct wiring, wireless communications, local area networks, wide area networks, radio-frequency (RF) links, optical links, or other communications technologies. For example, communications systems and methods useful in accordance with embodiments of the present invention are further described in U.S. Pat. Nos. 5,155,469 and 6,691,172, hereby incorporated herein by reference.

A non-exhaustive non-limiting list of sensors 110 includes a glass break sensor 111, a motion detector 112, a fire alarm pull 113, an intrusion switch 114, and a smoke detector 115. Each type of sensor may be associated with suggested and/or mandated installation, inspection, testing, maintenance, useful life, calibration, or other requirements and criteria. For example, the intrusion switch 114 may be a simple reed-type proximity switch, having a useful life far exceeding that of the fire safety system 50, requiring no scheduled maintenance or calibration action based on device longevity. After installation, however, the intrusion switch 114 may be tested for functionality before being placed into service, but need no further attention, other than a basic operational status check from time to time.

Depending on the specific application, the smoke detector 115 may have more stringent requirements. For example, the smoke detector 115 may be a custom continuous duty laser-based particulate discriminating detector in service at a hazardous material processing facility. The smoke detector 115 may be required to undergo periodic function testing, calibration, and preventative maintenance, including regular reporting to a regulatory agency. It should be understood that the above description of the smoke detector 115 is as an example provide only for illustrative purposes, and that the fire safety system 50 may include any number of smoke and/or fire detectors utilizing any detection technology, and associated with any number of building codes, ordinances, testing requirements, maintenance schedules, or other requirements.

It should also be understood that the term smoke detector is used as a generic term for sensors that detect the presence of smoke or fire, or other hazardous environmental conditions. A non-exhaustive non-limiting list of smoke detection technologies useful in accordance with the present invention includes particulate sensors, temperature sensors, temperature rate-of-change sensors, combustion by-product sensors, or other sensors that detect hazardous conditions such as smoke, gas leak, process failure, power event and/or fire.

A non-exhaustive non-limiting list of annunciators 120 includes strobes 121, speakers 122, light or light arrays 123, and alarms 124. The fire safety system 50 may include any number of annunciators 120 coupled to the system controller 100, such as strobes 121 in every hallway, speakers 122 and alarms 124 in every room, and lights 123 in a control panel of a fire alarm system in a large building. Other examples of the lights 123 include safety lighting in stairways and exit lighting at exits of the building. Other types of annunciators 120 include graphic displays and printouts of system status or alarm conditions.

A non-exhaustive non-limiting list of suppression systems 130 includes sprinkler systems 131 such as water, halon and/or foam based fire suppression technologies. A non-exhaustive non-limiting list of access control devices 140 includes a door hold device 141, a time clocked access system 142, a turnstile 143, a card reader entry device 144, and an active barrier 145. The active barrier 145 may be, for example, a movable firewall, a duct smoke and/or fire barrier, an emergency exit door, escape hatch, or other movable obstructing device. The door hold 141 may, for example, limit access to a facility without approval in a security condition, but release a door in a fire alarm condition.

It is contemplated that methods and components in accordance with the present invention may be useful with fire safety systems 50 incorporating any combination or number of components, from systems having a single sensor 110, a single system controller 100, and a single annunciator 120, to systems having a large number of nodes, each including many numbers of many types of components. It is further contemplated that the fire safety system 50 may operate solely as a fire alarm system, as a fire alarm and fire suppression system, solely as a security system, or as any combination of fire alarm, fire control, and security system without departing from the scope of the present invention.

Figure 2:
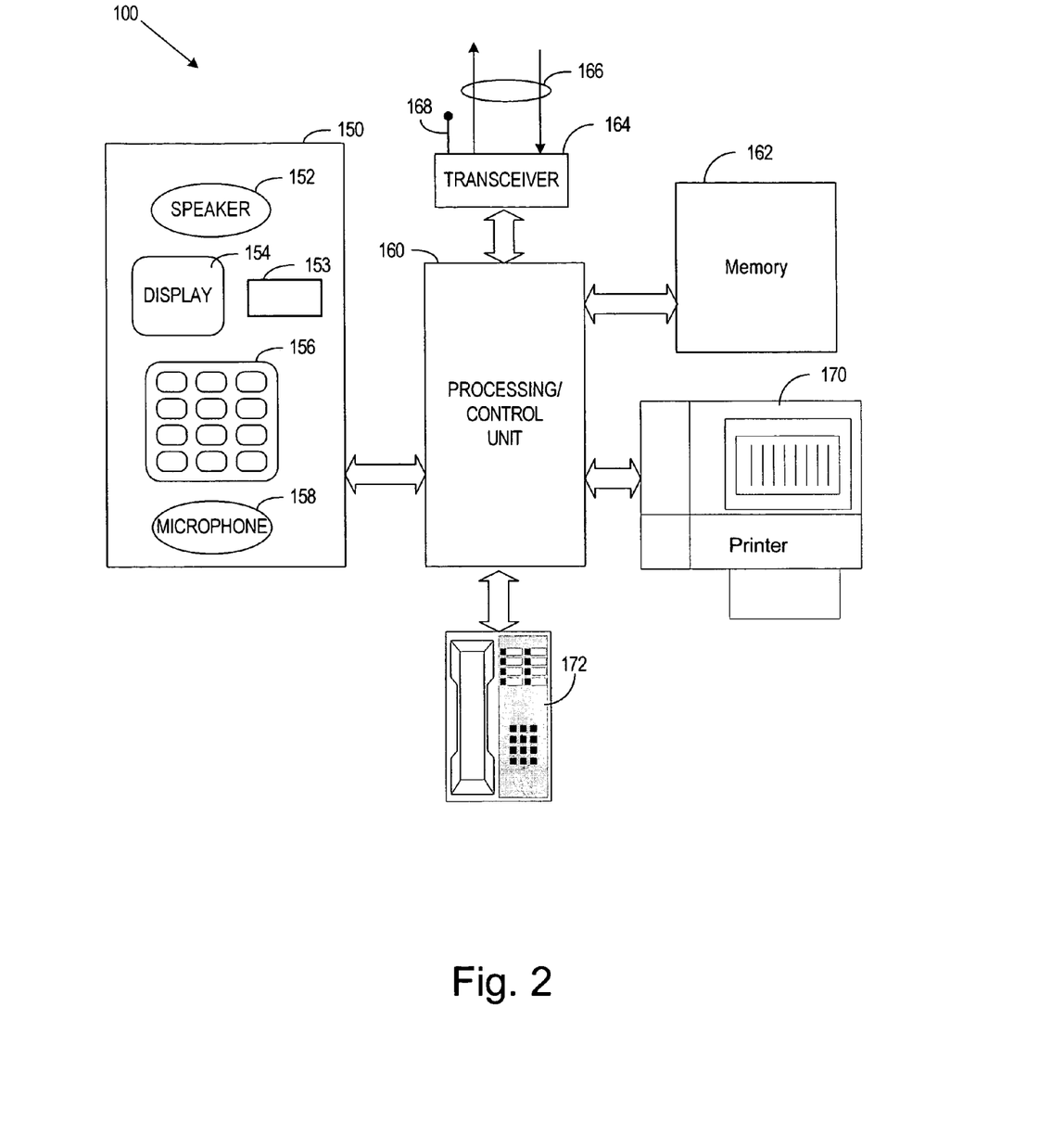
FIG. 2 is a block diagram of a system controller and other components of a fire safety system in accordance with embodiments of the present invention.

FIG. 2 is a block diagram of the system controller 100 of the fire safety system 50 in accordance with embodiments of the present invention, incorporating many possible (optional) components. The system controller 100 is illustrated in FIG. 2 to include a user interface 150 having a speaker 152, annunciating lights 153, a display 154, an input device 156, and a microphone 158. The user interface 150 is coupled to a processing unit 160. A suitable user interface 150 may be, for example, the interface included in an ONYX series NFS-3030 intelligent addressable fire alarm system available from NOTIFIER, a Honeywell company, Northford, Conn. The processing unit 160 is coupled to a memory 162, a transceiver 164, a printer 170 and a telephone 172.

The memory 162 may be volatile and/or non-volatile, it being understood that any useful architecture may be used. The memory 162 may be centrally located within the system controller 100, and/or may be distributed throughout the system. For example, intelligent components may include memory with each component, the memory at each component maintaining a record for that component of any scheduled requirements, and a history of actions performed on that particular component. The system controller 100 may then electronically poll some or all of its intelligent components, and generate reports using the polled information on a periodic or as-needed basis.

The system controller 100 may be, for example, a workstation such as a personal computer system, a wall mounted self-contained unit similar to the NFS-3030 described previously, or a combination of components providing the functionality necessary for the fire safety system 50. The transceiver 164 is illustrated including both a wireless communications capability 168 as well as a wired link 166 of a local area network, a wide area network, an Ethernet link, an Internet connection, or other wired communications technology. The transceiver may include any number of signal line circuits within its local area network, for example, the NFS-3030 described above includes 10 signal line circuits capable of supporting up to 3180 intelligent addressable components. The wireless communications capability 168 may include, for example, a short-range wireless communication interface, such as an interface conforming to a known communications standard, such as Bluetooth or IEEE 802 standards.

Figure 3:
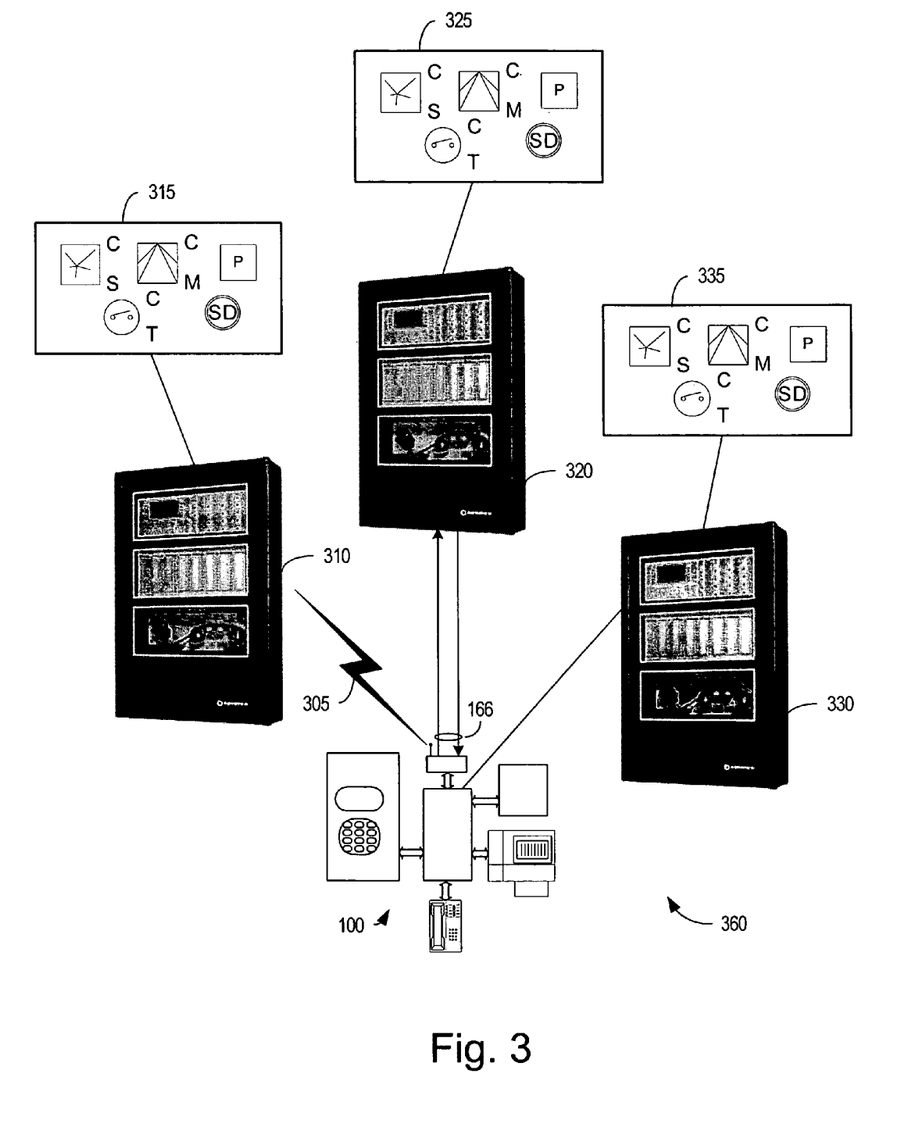
FIG. 3 is a block diagram of a multi-node fire safety system in accordance with embodiments of the present invention.

FIG. 3 is a block diagram of a multi-node fire safety system 360 in accordance with embodiments of the present invention. The system controller 100 may, for example, be a node supporting all the componentry associated with FIG. 1, but also be the primary node for a large-scale system including a first node 310, a second node 320, and a third node 330. The use of three nodes is depicted for purposes of illustration, and not limitation. Any number of systems and/or nodes may be connected or combined, such as in a global service response center for a global system.

The system controller 100 is illustrated in FIG. 3 as being hardwired to the third node 330, coupled to the second node 320 using the wired link 166 as a local area network, and wirelessly coupled to the first node 310 using, for example, an RF link 305. The multi-node fire safety system 360 may include any number of nodes communicatively coupled in any manner. For example, each node may be connected via Internet connections using URL identifiers, and communication between nodes may be via an Internet protocol such as TCP-IP.

The first node 310 is illustrated in FIG. 3 as controlling a grouping of sensors 315, the second node 320 is illustrated controlling a grouping of sensors 325, and the third node 330 is illustrated controlling a grouping of sensors 335. It should be understood that the nodes 310, 320, 330 may incorporate any number or type of sensors, annunciators, fire-suppression systems, and access control devices, and that the nodes 310, 320, 330 may themselves be primary nodes for other sub-levels of multi-node fire safety systems in very large-scale systems.

Figure 4:
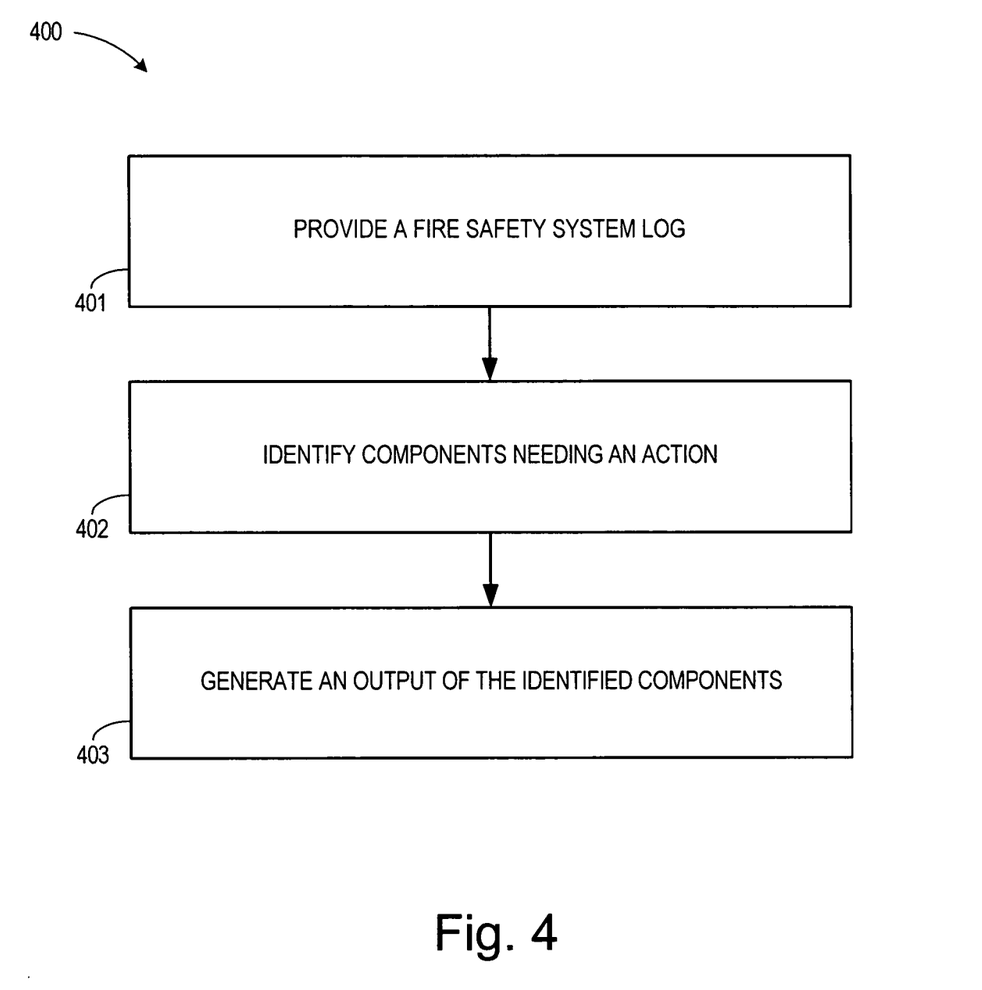
FIG. 4 is a flow chart of various processes associated with an intelligent component management methodology for a fire safety system in accordance with an embodiment of the present invention.

FIG. 4 is a flow chart illustrating a method 400 in accordance with the present invention. The method 400 involves providing a fire safety system log 401, used to track all the components of the fire safety system and to maintain a record of any actions performed on the components. The fire safety system is able to utilize the log to identify components that need an action 402, such as inspection, testing, maintenance, or calibration. A user or controller is provided with an output 403 (visual, aural, information bearing signal, and the like) that identifies which of the system components requires an action. The output may include any form of annunciation such as a report, an indicator light, or other perceivable indication to identify the component and its associated need. The output may also be an electronically dispatched service request. A maintenance work sheet may be provided as an output indication of which components need attention within a defined timeframe.

Figure 5:
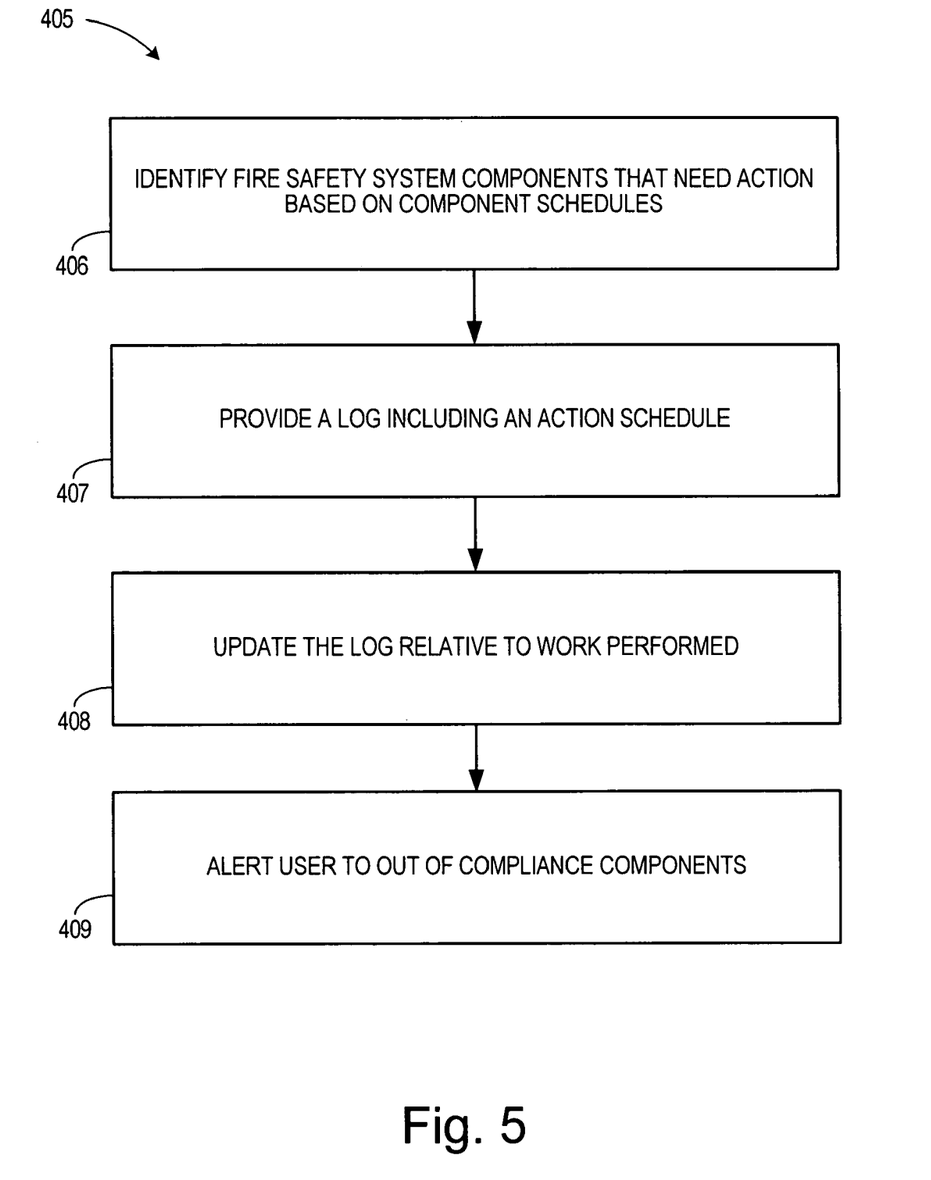
FIG. 5 is a flow chart of various processes associated with an intelligent component management methodology for a fire safety system in accordance with another embodiment of the present invention.

FIG. 5 is a flow chart illustrating a method 405 in accordance with embodiments of the present invention. The method 405 involves identifying 406 fire safety system components that require action based on component schedules. For example, the fire safety system may include many components, each associated with a schedule of desirable or mandatory inspection, testing, maintenance, calibration, or replacement actions. A log 407 is provided, which includes an action schedule for one or more components. After work is performed on a given component, the system log may be updated 408. After updating the log, the fire safety system may check the actions performed against the action schedule, and alert the user to out of compliant components at block 409. In this way, the fire safety system may intelligently inform users of desirable or required work that needs to be performed on the system, assuring compliance to ordinances and codes if the work is performed appropriately.

Figure 6:
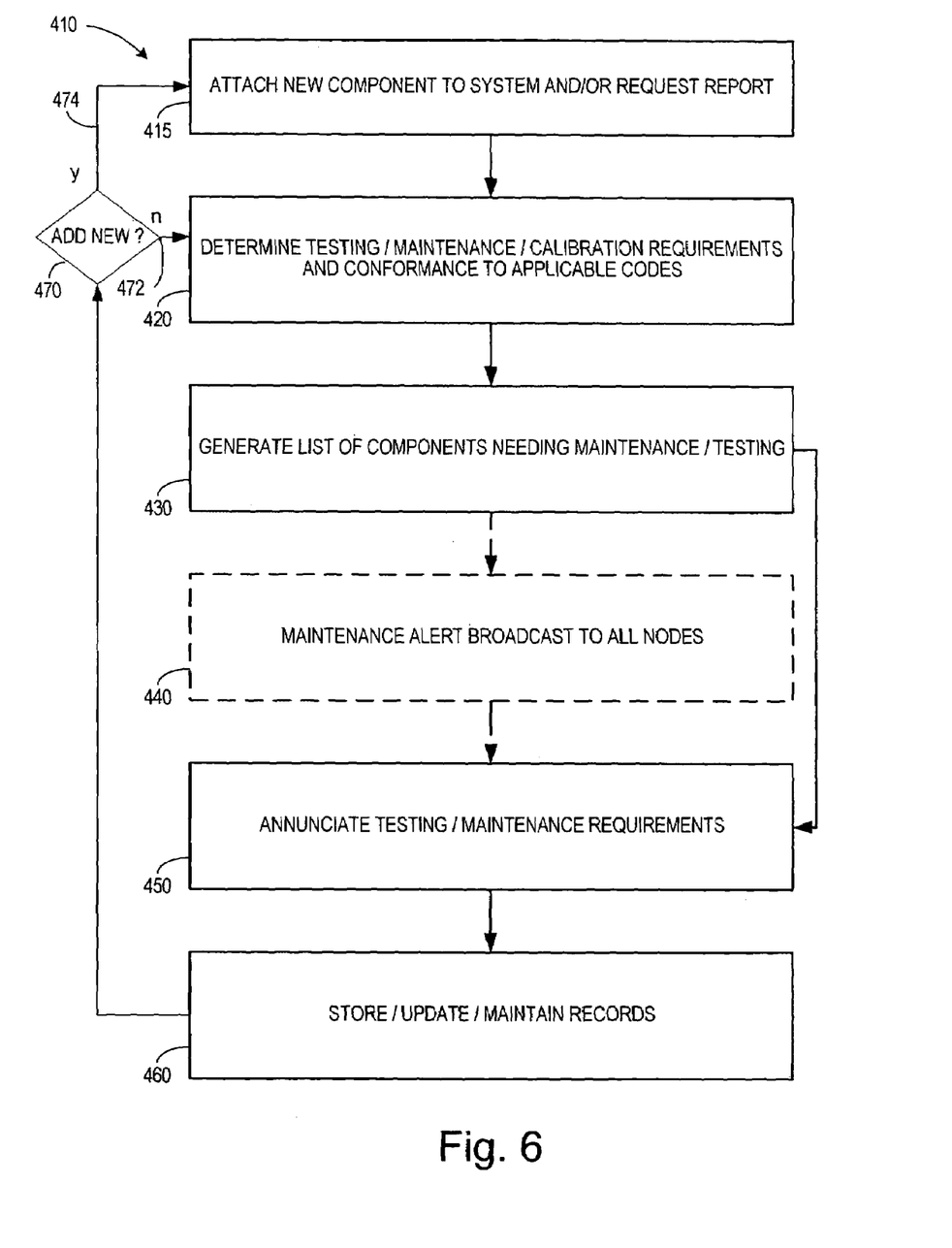
FIG. 6 is a flow chart of various processes associated with an intelligent component management methodology for a fire safety system in accordance with a further embodiment of the present invention.

FIG. 6 is a flow chart of an intelligent component management methodology 410 for a fire safety system in accordance with embodiments of the present invention. The method 410 may be implemented in hardware, software, or a combination of hardware and software. It is further understood that the components and functionality depicted as separate or discrete blocks/elements in FIGS. 1 through 6 may be implemented in combination with other components and functionality, and that the depiction of such components and functionality in individual or integral form is for purposes of clarity of explanation, and not of limitation.

Method 410 illustrates a subroutine configured to provide smart component management for fire safety system componentry in accordance embodiments of the present invention. As is illustrated in FIG. 6, the method 410 includes a decision 470 separating the method 410 into a maintenance loop 472 and an add-component loop 474. The maintenance loop 472 may run continuously, on-demand, periodically, and/or as a subroutine to diagnostics events such as system installations. The add-component loop 474 may be run any time a component is added to the fire safety system or when a report is requested for system maintenance, for example.

Block 415 indicates a desire to install a component to the fire safety system, generate a report related to the functionality of the fire safety system, and/or determine necessary inspection, testing, maintenance, and/or calibration of any components of the fire safety system. Block 420 illustrates the determination of requirements and conformance to applicable codes, ordinances, and/or specifications. For example, regulatory agencies such as FDA, NFPA, OSHA, and other federal, state, or local agencies promulgate requirements for fire safety systems. As an example, the US—NFPA 72 2002, Canadian—ULC-S536 and European Union—EN54 standards require periodic testing of fire safety systems and are incorporated into ordinances by government bodies. The method 410 may determine at block 420 that a test of all annunciation devices is needed, and continue to block 430, where a list is generated of all annunciation devices under the direct control of the fire safety system.

If the fire safety system running the method 410 is a primary node for a larger-scale fire safety system, block 440 indicates that the primary fire safety system may broadcast an alert to all nodes under the control of the master. The alert may request all the nodes to also perform the method 410 for components under control of the node's fire safety system, and report back to the primary fire safety system.

Block 450 illustrates that the fire safety system annunciates any requirements and/or results of the method 410 to a user, such as by printing a report, displaying a message, blinking a light, generating an audible message or alarm, or transmitting an information bearing signal to a remote location. The method 410 may then update the fire safety system's memory at block 460, thereby providing an accurate and up-to-date fire safety system log for future use and reporting purposes.

Uses of the method 410 include, for example, system maintenance personnel requesting a daily work-order for maintenance crews. The determination at block 420 may be for the fire safety system to identify any non-functioning components at a first-priority level, and identify any other components needing routine inspection, maintenance, calibration, and/or testing at a second priority level. The method 410 may then provide a work-order at annunciation block 450 for the maintenance personnel. For planning purposes, the method 410 may provide reports for maintenance crews of all inspection, testing, maintenance, and/or calibration actions needed to be performed within some future timeframe, such as within the next 30 or 60 days of work.

Another example of a use of the method 410 is to provide documentation and/or demonstration of conformance to applicable ordinances upon arrival of a fire marshal. Presenting the fire marshal with the system log showing all recent inspection, testing, and/or calibration actions, and current condition of all components, may expedite inspections. Further, the determination block 420 may be selectively linked to applicable codes specific to a particular ordinance, and the method 410 may provide a report specific to only the components of the fire safety system affected by the specific codes.

Yet another example of a use of the method 410 is to provide systems support personnel with a tool for determining the size and status of a fire safety system, such as when bidding on a maintenance contract. A report may be requested and generated that provides a list of every component installed on a fire safety system, along with dates of installation and service of each component, for purposes of estimating projected maintenance requirements and costs.

Other uses of methods and components in accordance with the present invention include, for example, initial system installation inspecting, testing, reacceptance testing, periodic testing, determination of maintenance requirements, annunciation of testing requirements, maintenance and test records retention, and system log information generation and updating, such as in response to addition or movement of components within the fire safety system.

The foregoing description of various example embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An automated method for managing a fire/security or other life safety system, the method comprising:
   electronically storing data at each component of a plurality of components of the system, wherein the data stored on each component relates to scheduling of maintenance tasks to be performed on the respective component;
   acquiring the data from the plurality of components via a network;
   providing a system log based on the data gathered via the network, the system log comprising a schedule associated with the plurality of components;
   identifying which of the plurality of components requires action in compliance with the associated schedule; and
   generating an output concerning the identified components.

2. The method of claim 1, wherein the required action comprises one or both of functional testing and visual inspection of the identified components.

3. The method of claim 1, wherein the required action comprises maintenance of the identified components.

4. The method of claim 1, wherein the required action comprises calibration of the identified components.

5. The method of claim 1, further comprising creating a record for each of the identified components, and storing the records in the system log.

6. The method of claim 5, wherein the records comprise a maintenance report for at least some of the identified components.

7. The method of claim 1, further comprising reviewing the schedules of at least some of the identified components based on conformance with an ordinance or specification.

8. The method of claim 1, wherein the output comprises an electronic service request concerning identified components requiring servicing.

9. The method of claim 1, wherein the output comprises a display concerning the identified components.

10. The method of claim 1, wherein the output comprises a visual or aural annunciation indicative of actions associated with the identified components.

11. The method of claim 1, wherein the output comprises selective illumination of visual annunciators associated with the identified components.

12. The method of claim 1, further comprising updating the system log to indicate actions performed relative to the identified components.

13. The method of claim 1, wherein the schedule comprises information indicative of a predetermined timeframe within which one or more required actions are to be performed for at least some of the identified components.

14. The method of claim 13, further comprising:
   updating the system log to indicate actions performed for the identified components; and
   generating an alert or report for each of the identified components that has an incomplete action at the expiration of the predetermined timeframe.

15. The method of claim 1, comprising generating an alert or report for the components associated with the system that are not in compliance with their associated schedule.

16. The method of claim 1, wherein the system comprises a system primary node and at least one other node, the method further comprising:
   the system primary node querying the at least one other node for a system log update;
   the at least one other node responding to the system primary node query by transmitting performed actions for components controlled by the at least one other node; and
   updating the system log with each node's performed actions prior to identifying which of the plurality of components requires action in compliance with the associated schedule.

17. The method of claim 1, comprising accessing the system from a local or remote location.

18. The method of claim 1, comprising accessing the system from a remote location and generating the output at the remote location.

19. The method of claim 1, comprising storing a service indicator in the system log indicative of a need for inspection, testing or calibration for a new component added to the system.

20. The method of claim 1, wherein the output comprises a report concerning the identified components.

21. A fire/security or other life safety system, the system comprising:
   means for storing data at each component of a plurality of components of the system, wherein the data stored on each component relates to scheduling of maintenance tasks to be performed on the respective component:

means for acquiring the data from the plurality of components via a network;

means for maintaining a system log comprising a list of components of the fire safety system, and a record of one or more of inspecting, testing, maintenance, and calibration of the components;

means for determining which components require one or more of inspecting, testing, maintenance, and calibration based on a schedule associated with the component based on the data acquired via the network; and means for identifying the components that need one or more of inspecting, testing, maintenance, and calibration using a prioritization scheme.

22. The system of claim 21, comprising means for identifying new components attached to the system.

23. The system of claim 21, comprising means for indicating components that are out of compliance relative to an ordinance or specification.

24. The system of claim 21, comprising means for broadcasting maintenance alerts to a plurality of nodes controlled by the fire safety system.

25. The system of claim 21, comprising means for generating a user perceivable output concerning one or more of the components.

26. The system of claim 21, comprising means for generating an electronic output or electrical signal output concerning one or more of the components.

27. The system of claim 21, comprising means for generating component maintenance log reports.

28. The system of claim 21, comprising means for accessing the system from a remote location.

29. A fire/security or other life safety system, the system comprising:

a system controller;

a plurality of system components each electronically storing data related to scheduling of maintenance tasks of the respective components, the plurality of system components comprising a plurality of sensors;

a memory coupled to the system controller and configured to maintain a system log comprising a record of each of the plurality of system components, the records comprising information concerning one or more of inspecting, testing, maintenance, and calibration of the system components, the memory further configured to support a schedule of actions associated with the system components;

a communications system configured to provide communications between the system controller and the system components; and a notification system configured to acquire the data from the plurality of system components via the communications system and produce an output concerning the schedule of actions associated with the system components based on the data, wherein the controller is configured to determine, using the system log and schedule of actions, which of the system components requires one or more of inspecting, testing, maintenance, and calibration.

30. The system of claim 29, comprising at least one node communicatively coupled to the system controller, the at least one node comprising:

a node controller;

a plurality of node components associated with the node; and a node memory coupled to the node controller and configured to maintain a node log, the node log comprising a node record of each of the node components, the node records comprising information concerning one or more of inspecting, testing, maintenance, and calibration of the node components.

31. The system of claim 29, wherein the notification system is configured to generate a report indicating the system components that require one or more of inspecting, testing, maintenance, and calibration.

32. The system of claim 29, wherein the notification system is configured to generate a list indicating the system components that are due for one or more of inspecting, testing, maintenance, and calibration within a pre-defined time frame.

33. The system of claim 29, wherein the notification system is configured to generate a report indicating the system components that have been subject to one or more of inspecting, testing, maintenance, and calibration.

34. The system of claim 29, wherein the notification system is configured to generate a report concerning actions performed on the system components.

35. The system of claim 29, wherein the notification system is configured to generate a report of the system log.

36. The system of claim 29, wherein the plurality of system components comprises one or more of a fire alarm pull and an intrusion switch.

37. The system of claim 29, wherein the plurality of system components comprises one or more of a glass break sensor, a motion detector, and a smoke detector.

38. The system of claim 29, wherein the communications system is configured to effect communications between the fire safety system and a network.

39. The system of claim 38, wherein remote operational control of the fire safety system is effected via the network.

40. The system of claim 38, wherein the notification system is configured to generate an information bearing signal indicative of system and component information for transmission over the network.

41. The system of claim 29, wherein the notification system comprises one or both of a display and a visual annunciator arrangement.

* * * * *